(12) United States Patent
Wang et al.

(10) Patent No.: US 11,727,210 B2
(45) Date of Patent: Aug. 15, 2023

(54) STRUCTURED GRAPH-TO-TEXT GENERATION WITH TWO STEP FINE-TUNING

(71) Applicant: salesforce.com, inc., San Francisco, CA (US)

(72) Inventors: Qingyun Wang, Urbana, IL (US); Nazneen Rajani, Mountain View, CA (US); Semih Yavuz, Redwood City, CA (US); Xi Lin, Palo Alto, CA (US)

(73) Assignee: Salesforce.com, Inc., San Francisco, CA (US)

( * ) Notice: Subject to any disclaimer, the term of this patent is extended or adjusted under 35 U.S.C. 154(b) by 73 days.

(21) Appl. No.: 17/162,040

(22) Filed: Jan. 29, 2021

(65) Prior Publication Data

US 2022/0050964 A1    Feb. 17, 2022

Related U.S. Application Data

(60) Provisional application No. 63/065,965, filed on Aug. 14, 2020.

(51) Int. Cl.
*G06F 40/284* (2020.01)
*G06F 40/205* (2020.01)
*G06F 40/10* (2020.01)

(52) U.S. Cl.
CPC ............ *G06F 40/284* (2020.01); *G06F 40/10* (2020.01); *G06F 40/205* (2020.01)

(58) Field of Classification Search
CPC ...... G06F 40/284; G06F 40/10; G06F 40/205; G06F 40/56; G06F 40/14; G06F 40/154
See application file for complete search history.

(56) References Cited

U.S. PATENT DOCUMENTS

| | | | |
|---|---|---|---|
| 2009/0138437 A1* | 5/2009 | Krishnamoorthy | ........................ G06F 16/24534 |
| 2016/0275180 A1* | 9/2016 | Matskevich | ............ G06F 16/93 |
| 2018/0232443 A1* | 8/2018 | Delgo | ...................... G06F 16/35 |
| 2021/0005182 A1* | 1/2021 | Han | ........................ G10L 25/24 |
| 2022/0004720 A1* | 1/2022 | Wu | ....................... G06N 3/0454 |
| 2022/0188899 A1* | 6/2022 | Malhotra | ............ G06Q 30/0251 |

OTHER PUBLICATIONS

Devlin et al., "BERT: Pre-training of Deep Bidirectional Transformers for Language Understanding", In Proceedings of NAACL-HLT 2019, Minneapolis, Minnesota, Jun. 2-Jun. 7, 2019, pp. 4171-4186.

(Continued)

*Primary Examiner* — Bhavesh M Mehta
*Assistant Examiner* — Paul J. Mueller
(74) *Attorney, Agent, or Firm* — Haynes and Boone, LLP

(57) ABSTRACT

Embodiments described herein provide systems and methods for data-to-text generation. The embodiments receive input data that includes a resource description framework (RDF) triples in an RDF graph. A data-to-text generation system generates position aware embeddings, including position embeddings, triple role embeddings, and tree-level embeddings. Using the position aware embeddings and the RDF graph, the data-to-text generation system generates a textual description for the RDF graph.

17 Claims, 7 Drawing Sheets

(56) References Cited

OTHER PUBLICATIONS

Darden et al., "The WebNLG Challenge: Generating Text from RDF Data", In Proceedings of The 10th International Natural Language Generation conference, Santiago de Compostela, Spain, Sep. 4-7, 2017, pp. 124-133.
Gururangan et al., "Don't Stop Pretraining: Adapt Language Models to Domains and Tasks", In Proceedings of the 58th Annual Meeting of the Association for Computational Linguistics, Jul. 5-10, 2020, pp. 8342-8360.
Herzig et al., "TAPAS: Weakly Supervised Table Parsing via Pre-training", In Proceedings of the 58th Annual Meeting of the Association for Computational Linguistics, Jul. 5-10, 2020, pp. 4320-4333.
Koncel-Kedziorski et al., "Text Generation from Knowledge Graphs with Graph Transformers", In Proceedings of NAACL-HLT 2019, Minneapolis, Minnesota, Jun. 2-Jun. 7, 2019, pp. 2284-2293.
Lewis et al., "BART: Denoising Sequence-to-Sequence Pre-training for NaturalLanguage Generation, Translation, and Comprehension", In Proceedings of the 58th Annual Meeting of the Association for Computational Linguistics, Jul. 5-10, 2020, pp. 7871-7880.
Moryossef et al., "Step-by-Step: Separating Planning from Realization in Neural Data-to-Text Generation", In Proceedings of NAACL-HLT 2019, Minneapolis, Minnesota, Jun. 2-Jun. 7, 2019, pp. 2267-2277.
Vaswani et al., "Attention Is All You Need", 31st Conference on Neural Information Processing Systems (NIPS 2017), Long Beach, CA, USA, 2017, 11 pages.
Velickovic et al., "Graph Attention Networks", In ICLR 2018, Feb. 4, 2018, 12 pages.
Wang et al., "Describing a Knowledge Base", In Proceedings of the 11th International Conference on Natural Language Generation, Tilburg, The Netherlands, Nov. 5-8, 2018, pp. 10-21.
Zhao et al., "Bridging the Structural Gap Between Encoding and Decoding for Data-To-Text Generation", In Proceedings of the 58th Annual Meeting of the Association for Computational Linguistics, Jul. 5-10, 2020, pp. 2481-2491.

\* cited by examiner

| Output |
|---|
| The Acharya Institute of Technology in Karnataka state was given Technical Campus status by All India Council for Technical Education in Mumbai. The school offers tennis which is governed by the International Tennis Federation. Karnataka has the Arabian Sea to its west and in the northeast is Telangana. |

|  | BLEU↑ | | | METEOR↑ | | | TER↓ | | |
| --- | --- | --- | --- | --- | --- | --- | --- | --- | --- |
|  | Seen | Unseen | All | Seen | Unseen | All | Seen | Unseen | All |
| Pipeline GRU† (2019) | 56.09 | 25.12 | 42.73 | 0.42 | 0.22 | 0.33 | 0.39 | 0.64 | 0.51 |
| Pipeline Transformer† (2019) | 56.28 | 23.04 | 42.41 | 0.42 | 0.21 | 0.32 | 0.39 | 0.63 | 0.50 |
| MELBOURNE (2017) | 54.52 | 33.27 | 45.13 | 0.41 | 0.33 | 0.37 | 0.40 | 0.55 | 0.47 |
| GCN-EC (2018) | 55.90 | - | - | 0.39 | - | - | 0.41 | - | - |
| BestPlan† (2019b) | 53.30 | 34.41 | 47.24 | 0.44 | 0.34 | 0.39 | 0.47 | 0.56 | 0.51 |
| PlanEnc (2020) | 64.42 | 38.23 | 52.78 | 0.45 | 0.37 | 0.41 | 0.33 | 0.53 | 0.42 |
| BART-base (2020b) | 58.71 | 38.47 | 49.81 | 0.43 | 0.35 | 0.39 | - | - | - |
| BART-large (2020b) | 62.46 | 35.87 | 49.49 | 0.45 | 0.36 | 0.41 | - | - | - |
| T5-base (2020b) | 62.93 | 50.88 | 57.46 | 0.45 | 0.41 | 0.43 | - | - | - |
| T5-large (2020b) | 63.06 | 54.69 | 59.29 | 0.45 | 0.42 | 0.44 | - | - | - |
| BART-base + position +Wiki | 63.06 | 45.60 | 55.15 | 0.44 | 0.38 | 0.41 | 0.35 | 0.48 | 0.41 |
| BART-large + position +Wiki | 64.16 | 45.02 | 55.30 | 0.46 | 0.39 | 0.43 | 0.34 | 0.50 | 0.42 |
| distill-BART-xsum + position + Wiki | 64.13 | 47.75 | 56.81 | 0.46 | 0.40 | 0.43 | 0.33 | 0.47 | 0.39 |
| T5-base + position + Wiki | 65.53 | 53.48 | 60.06 | 0.46 | 0.42 | 0.44 | 0.32 | 0.42 | 0.37 |
| T5-large + position + Wiki | 65.65 | 53.19 | 60.06 | 0.46 | 0.42 | 0.44 | 0.33 | 0.42 | 0.37 |

*FIG. 7*

STRUCTURED GRAPH-TO-TEXT GENERATION WITH TWO STEP FINE-TUNING

CROSS-REFERENCE TO RELATED APPLICATIONS

This application is a nonprovisional of and claims priority under 35 U.S.C. 119 to U.S. provisional Application No. 63/065,965, filed Aug. 14, 2020, which is hereby expressly incorporated by reference herein in its entirety.

TECHNICAL FIELD

The disclosure relates generally to data-to-text generation systems based on machine learning, and more specifically to systems that generate a description from structured input data using position aware embeddings.

BACKGROUND

Data-to-text generation is treated as a graph-to-text generation task, where a model receives a complex knowledge graph and generates a faithful description. Currently neural network-based machine learning methods are divided into two categories: end-to-end data-to-text generation which directly generate descriptions from input knowledge graphs, and a two-step generation methods which try to control generation quality by first explicitly reasoning about the underlying structure. A conventional end-to-end data-to-text generation module utilizes large pretrained language model to generate text. However, the end-to-end data-to-text generation module may generate fabricated facts from the pretrained language model or incorrectly divide the triples. Moreover, when receiving the structured input, some of the models may simply concatenate those triples together. Other models use complicated graph neural networks that encode the triple structures for generation.

BRIEF DESCRIPTION OF THE DRAWINGS

FIG. 3 is an example textual description generated from the structured input data, according to some embodiments.

FIG. 7 illustrates a table that illustrates results of the data-to-text generation system compared to conventional data-to-text generation systems.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

Various embodiments are directed to data-to-text generation systems that may generate a textual description from structured input data. More specifically, given a structured input data, such as a set of resource description framework (RDF) triples or a Wikipedia infobox in the form of trees or graphs, the embodiments may generate corresponding text descriptions. In accordance with the disclosure herein, the data-to-text generation system may be trained to generate position aware embeddings for the structured input data. The position aware embeddings may help the data-to-text generation system to fully capture input structures such as a word position and its role in the structured data, location of the triple in the structured data, and tree-level order of the triple in some embodiments.

The embodiments are also directed to pre-training a generative language model with position aware embeddings. The position aware embeddings help the linearized knowledge graph to more flexibly encode the graph structure and external knowledge such as entity type information from the background data dumps, such as Wikipedia dumps.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks, such as supervised or unsupervised neural networks, convolutional neural networks, or memory-augmented neural networks, among others.

Figure 1:
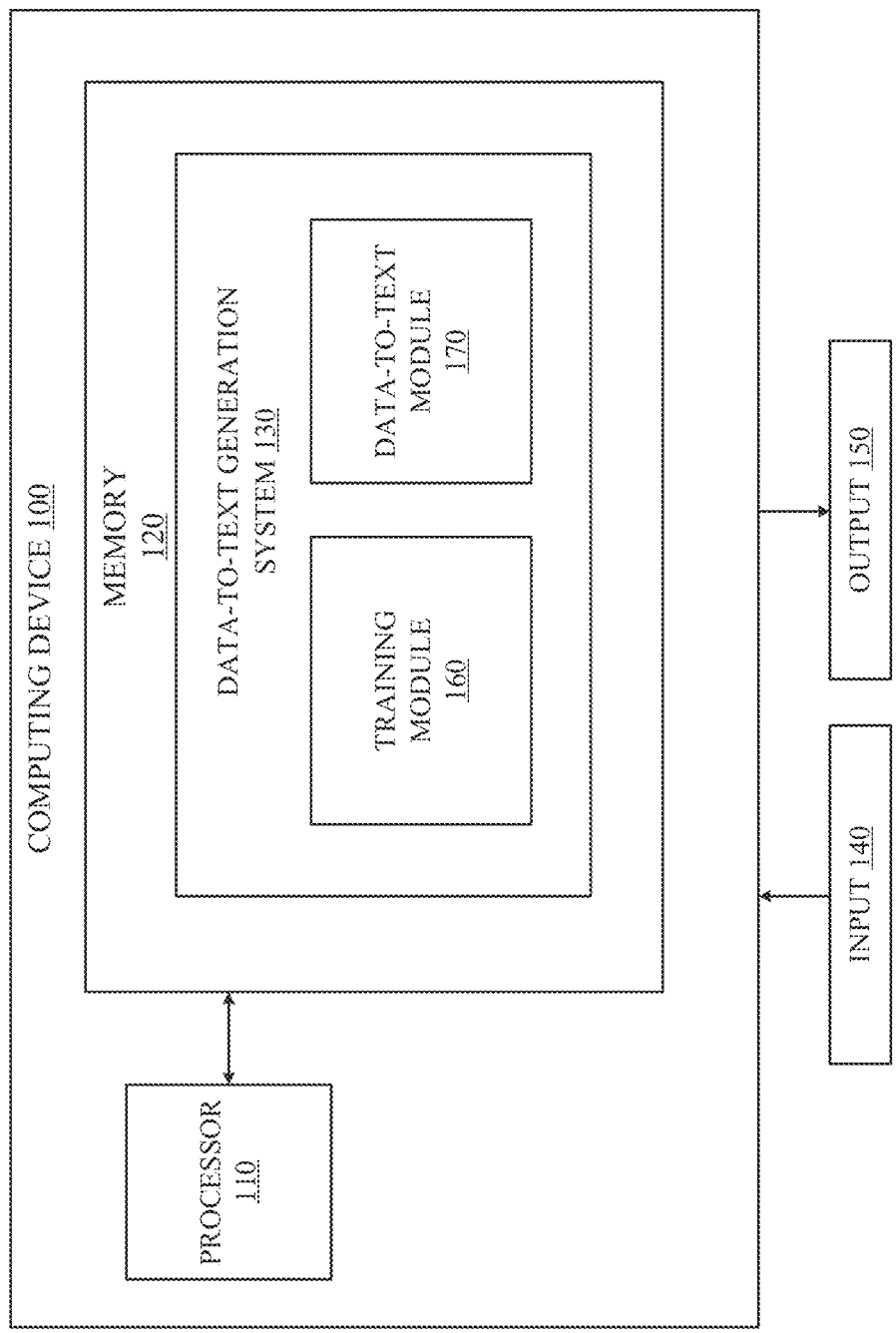
FIG. 1 is a simplified diagram of a computing device for implementing a data-to-text generation system, according to some embodiments.

FIG. 1 is a simplified diagram of a computing device 100 for implementing data-to-text generation system, according to some embodiments. Computing device 100 includes processor 110 and memory 120. Memory 120 includes a data-to-text generation system 130. In some examples, data-to-text generation system 130 may be used to receive and handle input 140. The input may be structured data, such as a resource description framework (RDF) graph discussed below. Data-to-text generation system 130 may include a training module 160 and data-to-text module 170. Training module 160 and data-to-text module 170 may further include additional submodules, such as those described in to FIGS. 2-6 or may be implemented in hardware, software, and/or a combination of hardware and software. Both training module 160 and data-to-text module 170 may be implemented as one or more neural network models and components thereof.

As shown in FIG. 1, processor 110 is coupled to memory 120. Operation of computing device 100 is controlled by processor 110. And although computing device 100 is shown with only one processor 110, it is understood that processor 110 may be representative of one or more central processing units (CPUs), multi-core processors, microprocessors, microcontrollers, and/or the like in computing device 100. Although processor 110 may include one or more general purpose central processing units (CPUs), processor 110 may additionally or alternately include at least one processor that provides accelerated performance when evaluating neural network models. For example, processor 110 may include a graphics processing unit (GPU), an application specific integrated circuit (ASIC), a field programmable gate array (FPGA), a tensor processing unit (TPU), a digital signal processor (DSP), a single-instruction multiple-data (SIMD)

processor, and/or the like. Generally, such processors may accelerate various computing tasks associated with evaluating neural network models (e.g., training, prediction, preprocessing, and/or the like) by an order of magnitude or more in comparison to a general-purpose CPU. Computing device 100 may be implemented as a stand-alone subsystem, as a board added to a computing device, and/or as a virtual machine.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

Memory 120 may be used to store instructions executable by computing device 100 and/or one or more data structures used during operation of computing device 100. Memory 120 may include one or more types of machine-readable media. In some examples, memory 120 may include non-transitory, tangible, machine-readable media that includes executable code that when run by one or more processors (e.g., processor 110) may cause the one or more processors to perform the methods described in further detail herein. Memory 120 may include various types of short-term and/or long-term storage modules including cache memory, random access memory (RAM), static random access memory (SRAM), dynamic random access memory (DRAM), non-volatile memory (NVM), flash memory, solid state drives (SSD), hard disk drive (HDD), optical storage media, magnetic tape, any other memory chip or cartridge, and/or any other medium from which a processor or computer is adapted to read. Some common forms of machine-readable media may include flexible disk, hard disk, magnetic tape, any other magnetic medium, compact disk read-only memory (CD-ROM), any other optical medium, punch cards, paper tape, any other physical medium with patterns of holes, programmable read-only memory (PROM), erasable programmable read-only memory (EPROM), electrically erasable programmable read-only memory (EEPROM), any other memory chip or cartridge, and/or any other medium from which a processor or computer is adapted to read.

In some embodiments, memory 120 includes instructions for data-to-text generation system 130 that may be used to implement and/or emulate the systems and models, and/or to implement any of the methods described further herein. The data-to-text generation system 130 may correspond to a neural network model that is evaluated by processor 110. In particular, the data-to-text generation system 130 may include a plurality of neural network layers. Examples of neural network layers include densely connected layers, convolutional layers, recurrent layers, pooling layers, dropout layers, and/or the like. In some embodiments, the data-to-text generation system 130 may include at least one hidden layer that is not directly connected to either an input or an output of the neural network. The data-to-text generation system 130 may further include a plurality of model parameters (e.g., weights and/or biases) that are learned according to a machine learning process. Examples of machine learning processes include supervised learning, reinforcement learning, unsupervised learning, and/or the like.

Computing device 100 may receive input 140, which may be structured data, such as an RDF graph. Input 140 may be provided to the data-to-text generation system 130. The data-to-text generation system 130 operates on the input 140 to generate an output 150. Output 150 may be a textual description of the input 140, e.g. textual description of the RDF graph. Although the description below is discussed in terms of RDF, the embodiments equally apply to other types of structured data.

Figure 2:
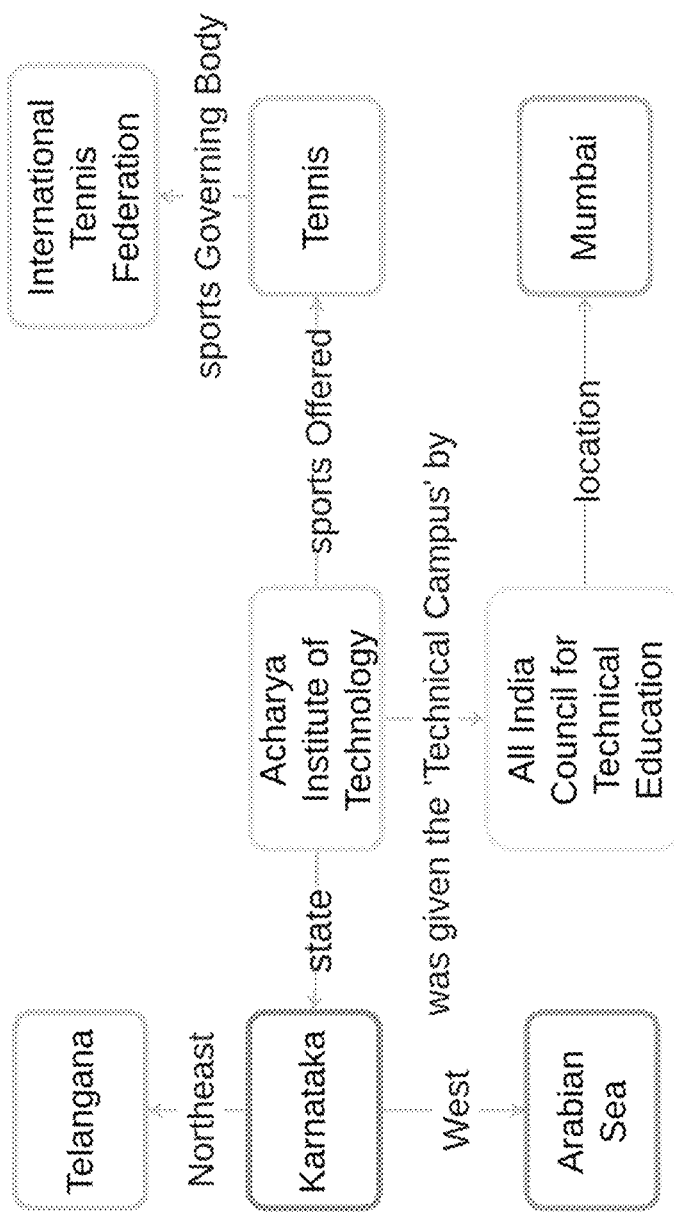
FIG. 2 is an example structured input data, according to some embodiments.

FIG. 2 illustrates a diagram of an example resource description framework (RDF) graph 200, according to some embodiments. The underlying structure of any expression in an RDF graph 200 may be a collection of triples. Each tripe may include a subject (S), a predicate (P) and an object (O). The RDF graph 200 may be stored as a data structure in a memory of a computer discussed in FIG. 1. Each triple in the RDF graph 200 may be in a {S, P, O} format, where the subject and object are nodes in the RDF graph 200 and the predicate is a link between the two nodes. Some example triples from the RDF graph 200 in FIG. 2 may be {"Karnataka", "state", "Acharya Institute of Technology"}, {"Acharya Institute of Technology", "sports offered", "location"}, {"Tennis", "sports governing body", "International Tennis Federation"}, and {"Telangana", "northeast", "Karnataka"}.

FIG. 3 illustrates a diagram 300 of a textual description that the data-to-text generation system may generate from an RDF graph, according to some embodiments. The output illustrated in FIG. 3 may be output 150 that is a textual description of RDF graph 200 illustrated in FIG. 2. Notably, the textual description includes words in the triples of RDF graph 200.

Going back to FIG. 1, data-to-text module 170 in data-to-text generation system 130 may be or include a pre-trained language model. Some nonlimiting examples of the pre-trained language model may be BART, distill-BART-xsum, and T5 or their variants. The pre-trained language models may include one or more embedding layers, encoders, decoders, attention layers and/or classifiers in some embodiments. As discussed above, data-to-text module 170 may receive structured data and generate a textual description of the structured data.

Figure 4:
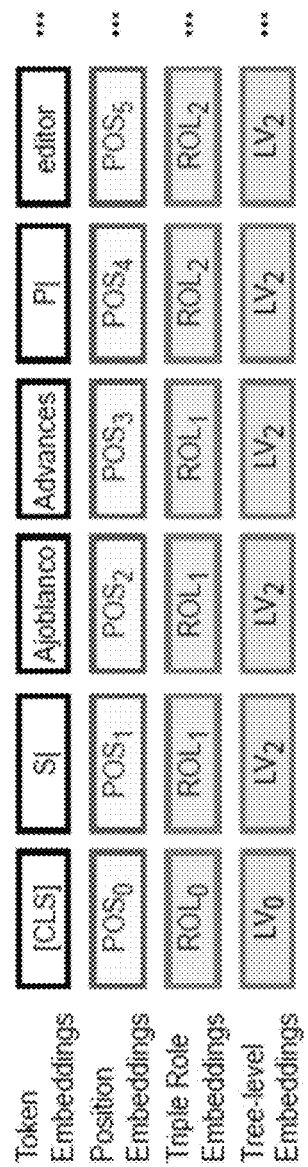
FIG. 4 is diagram illustrating position aware embeddings, according to some embodiments.

In some embodiments, training module 160 may train data-to-text module 170 using known structured datasets, such as WebNLG dataset or a Wikipedia Corpus. Unlike conventional language models, training module 160 may also train data-to-text module 170 to generate and process different types of embeddings, including position aware embeddings. Example embeddings may be token embeddings. Example position aware embeddings may be position embeddings, triple role embeddings, and tree-level embeddings. FIG. 4 illustrates a block diagram 400 of embeddings, according to some embodiments. These embeddings may include token embeddings, position embeddings, triple role embeddings, and tree-level embeddings.

In some embodiments, token embeddings may include embeddings for tokens that correspond to words (entities and relations) in RDF graph 200 as well as embeddings for tokens with an indication that the token stores a subject, a predicate, or an object. Typically, there may be one token embeddings per word, and one token for an indicator that indicates whether the word or words are associated with a subject (S), predicate (P), or object (O). For example, suppose RDF graph 200 includes a portion of a triple where a subject (S) is "Ajoblanco Advances" and predicate (P) is "editor." FIG. 4 illustrates that for this case, the token embeddings may include token embeddings for words "Ajoblanco," "Advances," and "editor," as well as token embeddings for the subject (S|) and predicate (P|). For example, token embedding for subject (S|) indicate that the following tokens stores subjects, such as "Ajoblanco" and "Advances." Additionally, a special [CLS] token may be concatenated to the beginning of the first triple, to indicate a beginning of the RDF graph 200. Training module 160 may train data-to-text module 170 to generate a token embedding for the special [CLS] token.

In some embodiments, position embeddings may include a position identifier (ID). The position ID is an index of the token in the flattened RDF graph 200 sequence. For example, the position embedding for the [CLS] token may indicate that token [CLS] is in a zeroth position, that is Position ID=0 (if the position count begins with zero), position embedding for token "S|" may indicate that the token is in the first position, that is position ID=1, and position embedding for token "Ajoblanco" may indicate that the token is in the second position, that is position ID=2.

In some embodiments, triple role embeddings may include a triple role ID that differentiates different triple roles. The triple role ID may be set to one for a subject indicator "S|" and words that correspond to the subject, to two for a relation indicator (e.g. predicate "P|") and words that correspond to the relation, and three for an object indicator ("O|") and words that correspond to an object, in some embodiments. With reference to FIG. 4, triple role ID may be set to one for tokens "S|," "Ajoblanco," and "Advances" for the subject in the triple, and triple role ID may be set to two for tokens "P|" and "editor" for a relation in the triple.

In some embodiments, the tree level embeddings may include a tree level ID. The tree level ID may indicate the distance, e.g. number of relations from the root of the parsing tree that may store parsed RDF graph. With reference to FIG. 4, tree level ID for all tokens in the triple may be set to two and tree level ID may be set to zero for the special [CLS] token.

Going back to FIG. 1, in some embodiments, training module 160 may pretrain the data-to-text module 170 using a dataset, such as a Wikipedia dataset that includes wikidata-description pairs. The wikidata-description pairs may be RDF graph-description pairs. To pretrain the data-to-text module 170, training module 160 may create different categories in the dataset and select the graph-description pairs for a particular category. Training module 160 may then linearize the dataset in the particular category by prepending tokens such as [CLS], S|, P|, and O| to the dataset and pass the dataset through data-to-text module 170 that is trained to recognize the token embeddings, position embeddings, triple role embeddings, and tree-level embeddings. Once data-to-text module 170 is trained, data-to-text module 170 may be used to generate text description for an RDF graph.

Figure 5:
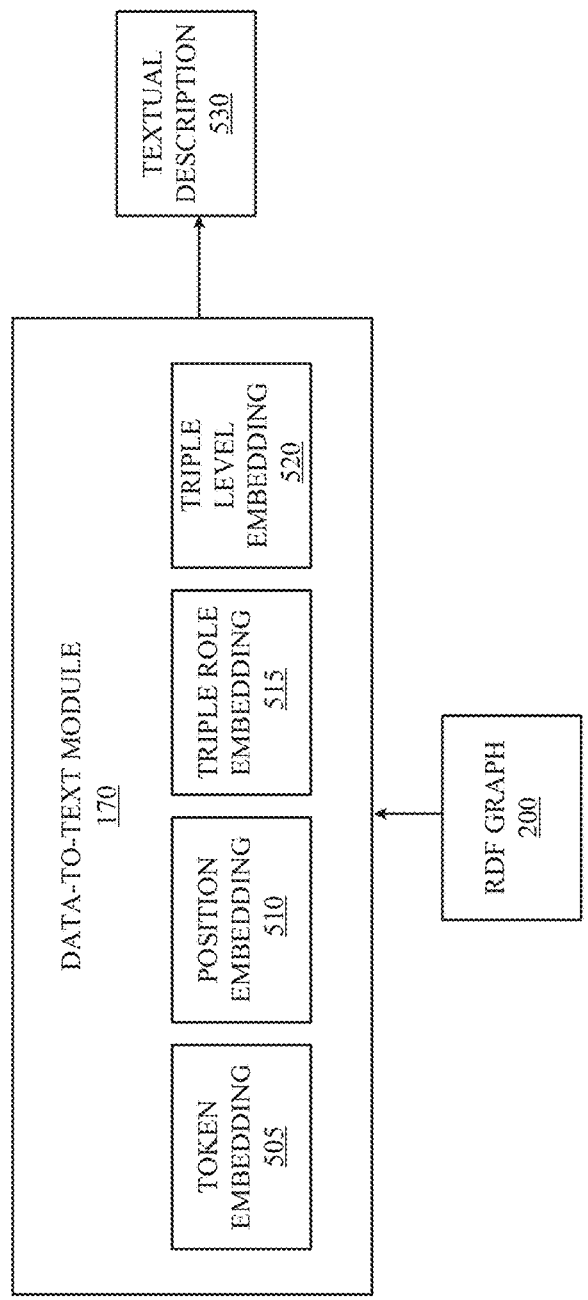
FIG. 5 is a block diagram of a data-to-text module, according to some embodiments.

FIG. 5 illustrates a block diagram 500 of an example model architecture for a data-to-text module, according to some embodiments. Data-to-text module 170 may receive RDF graph 200. Once received, data-to-text module 170 may generate embeddings, such as token embeddings 505, and position aware embeddings, such as position embeddings 510, triple role embeddings 515, and tree-level embeddings 520 for the RDF graph 200. Using token embeddings 505, position embeddings 510, triple role embeddings 515, and tree-level embeddings 520, data-to-text module 405 may use its pre-trained generative language model to determine a textual description 530 for RDF graph 200, such as the output illustrated in FIG. 3.

Figure 6:
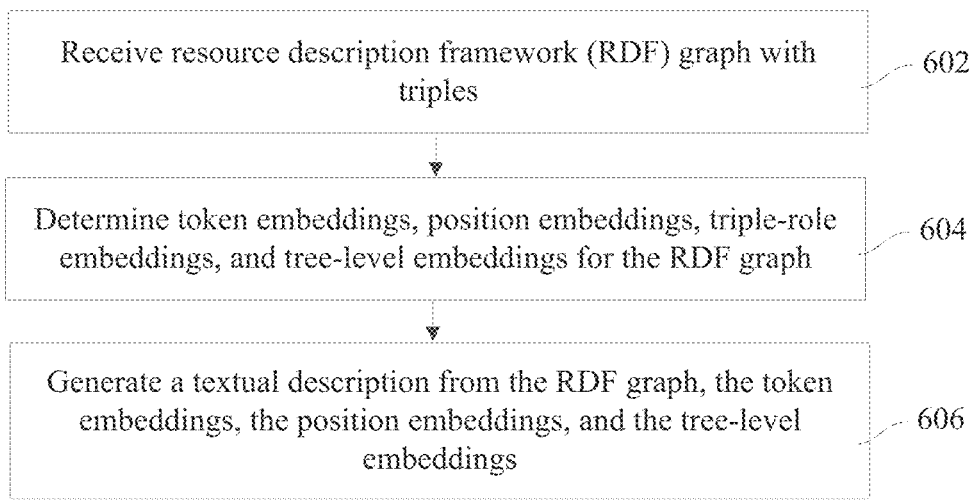
FIG. 6 is a flowchart of a method for generating a textual description using a data-to-text generation system, according to some embodiments.

FIG. 6 is a simplified diagram of a method 600 for generating a description using a data-to-text generation system, according to some embodiments. One or more of the processes 602-606 of method 600 may be implemented, at least in part, in the form of executable code stored on non-transitory, tangible, machine-readable media that when run by one or more processors may cause the one or more processors to perform one or more of the processes 602-606.

At process 602, a structured data, such as an RDF graph that includes triples is received. As discussed above, data-to-text generation system 130 may receive structured data, such as RDF graph 200.

At process 604, embeddings are generated. For example, data-to-text generation system 130 generates token embeddings 505, and position aware embeddings, such as position embeddings 510, triple role embeddings 515, and tree-level embeddings 520 from triples in RDF graph 200.

At process 608, a description is generated. For example, the pre-trained generative language model of data-to-text module 170 may generate a textual description, such as output 150 shown in FIG. 3 of structured data, e.g., RDF graph 200, using the triples in the RDF graph 200 and the embeddings generated in process 604.

FIG. 7 illustrates a table 700 that includes results of the data-to-text generation system compared to conventional data-to-text generation systems. The pre-trained generative language models included in data-to-text module 170 may be the BART-base model, the BART-xsum-12-6 model or the T5-base model trained using training module 160 to include token embeddings and position aware embeddings. Additionally, the BART-base model, the BART-xsum-12-6 model or the T5-base model may be trained using a structured dataset, such as the Wikipedia dataset. The results of the data-to-text generation system 130 that includes data-to-text module 170 with the pre-trained generative language models discussed above is compared against conventional generative language models. These conventional models are Pipeline GRU, Pipeline Transformer, MELBOURNE, GCN-EC, BestPlan, PlanEnc, R5-base, and T5-large model. The BLUE, METEOR, and TER scripts were used to generate the results. As illustrated in FIG. 7, the data-to-text module 170 that includes the BART-base, Bart-large, distill-BART-xsum, T5-base, and T5-large that are trained using training module 160 generated superior results and outperform conventional generative language models.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system comprising:
a non-transitory memory; and
one or more hardware processors coupled to the non-transitory memory and configured to read instructions from the non-transitory memory to cause the system to perform operations comprising:
receiving, at a data-to-text generation system that includes a generative language model, an input data that includes resource description framework (RDF) triples in an RDF graph;
generating, using the data-to-text generation system, embeddings from the RDF graph based on tokens of the input data, wherein the embeddings include a position aware embedding that identifies a position of an RDF triple of the RDF triples in the RDF graph; and
generating, using the data-to-text generation system, a textual description of the input data based on the embeddings and the RDF graph,
wherein the position aware embedding includes a position embedding that identifies a position of a token indicating whether a word in the RDF triple of the RDF triples is a subject, a relation, or an object.

2. The system of claim 1, wherein the RDF triple includes words that correspond to a subject, a relation, or an object.

3. The system of claim 1, wherein the position aware embedding includes a position embedding that identifies a position of a token that stores a word in the RDF triple from the RDF triples.

4. The system of claim 1, wherein the position aware embedding includes a triple role embedding that identifies that a token includes a word or an indication of a role of the word in the RDF triple from the RDF triples that corresponds to a subject, an object, or a relation.

5. The system of claim 1, wherein the position aware embedding includes a tree-level embedding that identifies a tree distance from a root of a parsing tree to a level in the parsing tree that includes a token, wherein the token stores a word or an indication of a role of the word in the RDF triple from the RDF triples.

6. The system of claim 1, wherein the generating the embeddings further comprises generating a token embedding that identifies a token that stores a word or an indication of a role of the word in the RDF triple from the RDF triples.

7. A method comprising:
receiving, at a data-to-text generation system that includes a generative language model, the data-to-text generation system configured to execute on a processor, an input data that includes resource description framework (RDF) triples in an RDF graph;
generating, using the data-to-text generation system, embeddings from the RDF graph based on tokens of the input data, wherein the embeddings include a position aware embedding that identifies a position of an RDF triple of the RDF triples in the RDF graph; and
generating, using the data-to-text generation system, a textual description of the input data based on the position aware embedding and the RDF graph,
wherein the position aware embedding includes a position embedding that identifies a position of a token indicating whether a word in the RDF triple of the RDF triples is a subject, a relation, or an object.

8. The method of claim 7, further comprising:
training the generative language model to generate the position aware embeddings.

9. The method of claim 7, wherein the position aware embedding includes a position embedding that identifies a position of a token that stores a word in the RDF triple from the RDF triples.

10. The method of claim 7, wherein the position aware embedding includes a triple role embedding that identifies that a token includes a word or an indication of a role of the word in the RDF triple from the RDF triples that corresponds to a subject, an object, or a relation.

11. The method of claim 7, wherein the position aware embedding includes a tree-level embedding that identifies a tree distance from a root of a parsing tree to a level in the parsing tree that includes a token, wherein the token stores a word or an indication of a role of the word in the RDF triple from the RDF triples.

12. The method of claim 7, wherein the generating the embeddings further comprises generating a token embedding that identifies a token that stores a word or an indication of a role of the word in the RDF triple from the RDF triples.

13. A non-transitory machine-readable medium having stored thereon machine-readable instructions executable to cause a machine to perform operations comprising:
receiving, at a data-to-text generator that includes a generative language model, an input data that includes structured data triples in a structured graph;
generating, using the data-to-graph generator, embeddings from the structured graph based on tokens of the input data, wherein the embeddings include position aware embeddings that identify position of a triple of triples in the structured graph; and
generating, using a data-to-text module, a textual description of the input data based on the position aware embeddings and the structured graph,
wherein the position aware embeddings include a position embedding that identifies a position of a token indicating whether a word in the triple of the triples is a subject, a relation, or an object.

14. The non-transitory machine-readable medium of claim 13, wherein the position aware embeddings include a position embedding that identifies a position of a token that stores a word in the triple from the triples.

15. The non-transitory machine-readable medium of claim 13, wherein the position aware embeddings include a triple role embedding that identifies that a token includes a word or an indication of a role of the word in the triple from the triples that corresponds to a subject, an object, or a relation.

16. The non-transitory machine-readable medium of claim 13, wherein the position aware embeddings include a tree-level embedding that identifies a tree distance from a root of a parsing tree to a level in the parsing tree that stores a token, wherein the token includes a word or an indication of a role of the word in the triple from the triples.

17. The non-transitory machine-readable medium of claim 13, wherein the generating the embeddings further comprises generating token embeddings that identify a token that stores a word or an indication of a role of the word in the triple from the triples.

\* \* \* \* \*